(No Model.)

W. I. ADAMS.
PAN FOR THE USE OF PHOTOGRAPHERS.

No. 345,871. Patented July 20, 1886.

Witnesses
Chas. F. Wards
Geo Wadman

Inventor
W. Irving Adams
by his attorneys
Gifford & Brown

UNITED STATES PATENT OFFICE.

W. IRVING ADAMS, OF MONTCLAIR, NEW JERSEY, ASSIGNOR TO THE SCOVILL MANUFACTURING COMPANY, OF NEW YORK, N. Y.

PAN FOR THE USE OF PHOTOGRAPHERS.

SPECIFICATION forming part of Letters Patent No. 345,871, dated July 20, 1886.

Application filed March 15, 1886. Serial No. 195,250. (No model.)

*To all whom it may concern:*

Be it known that I, W. IRVING ADAMS, of Montclair, in the county of Essex and State of New Jersey, have invented a certain new and useful Improvement in Pans for the Use of Photographers, of which the following is a specification.

My improvement relates to pans intended for the general use of photographers.
My improvement consists in a new article of manufacture—namely, a pan made of wood impregnated with paraffine and coated with asphaltum-varnish.

Figure 1:
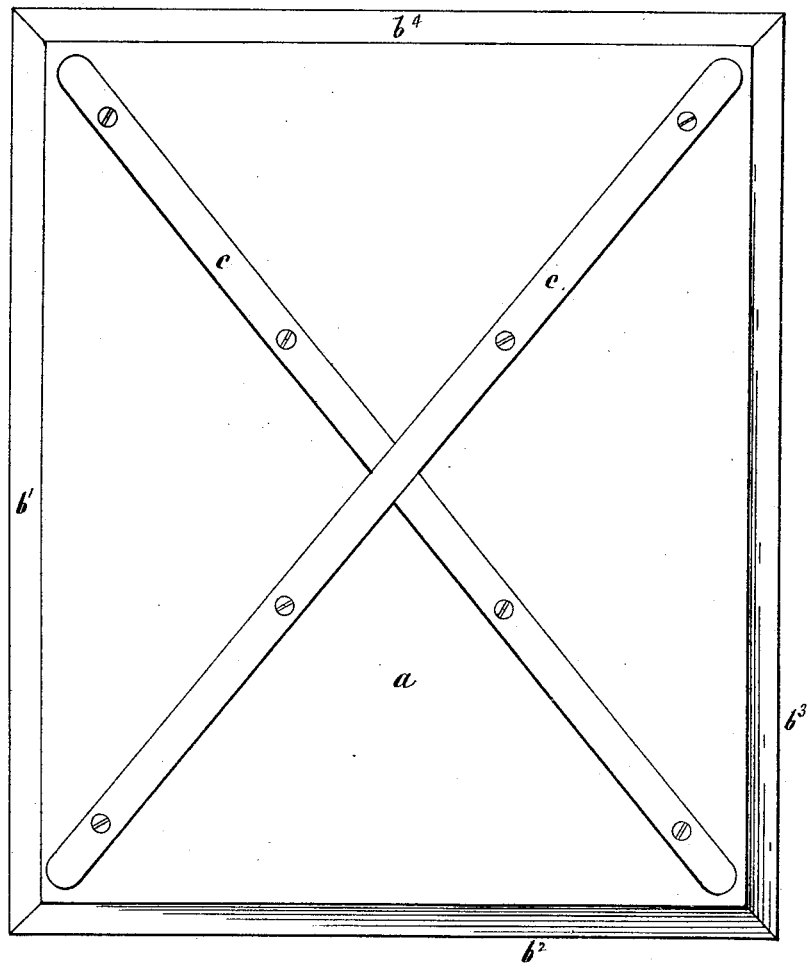
Figure 2:
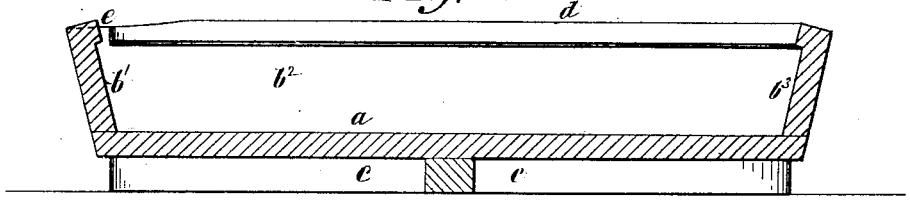

In the accompanying drawings, Figure 1 is an inverted plan of a pan embodying my improvement. Fig. 2 is a vertical section of the same.

Similar letters of reference designate corresponding parts in both figures.
This pan is composed of a bottom, $a$, made of one or more pieces of board, sides made of pieces of board, $b'$ $b^2$ $b^3$ $b^4$, inclined at the ends and mitered together, so that the pan will flare upwardly. These component parts of the pan may be secured together by nails, or in any other suitable manner. The bottom may be strengthened by cleats $c$, extending obliquely across it.

As shown, the sides are provided with a flange, $d$, at the upper edge of the inner surface. At one corner the top surface of adjacent portions of two sides is chamfered off and the flange $d$ is cut away, so as to form a spout, $e$, by means of which the contents of the pan may be easily poured out of it.

I treat the wood composing the pan with paraffine so as to thoroughly impregnate it with that substance. This I accomplish by boiling the wood repeatedly in liquid paraffine. After the treatment of the wood with paraffine I apply to the pan one or more coatings of asphaltum-varnish. In this way I produce a very light, strong, durable, and cheap pan, adapted for the general use of photographers.

What I claim as my invention, and desire to secure by Letters, is—

As a new article of manufacture, a pan for photographers' use, made of wood impregnated with paraffine and coated with asphaltum-varnish, substantially as specified.

W. IRVING ADAMS.

Witnesses:
WILLARD H. FULLER,
HENRY P. SEE, Jr.